US012320262B2

(12) United States Patent
Donnelly et al.

(10) Patent No.: US 12,320,262 B2
(45) Date of Patent: Jun. 3, 2025

(54) THERMAL SOAK-BACK MITIGATION

(71) Applicant: ROLLS-ROYCE PLC, London (GB)

(72) Inventors: David M Donnelly, Bristol (GB);
Derek S Wall, Bristol (GB); Jonathan Wieland, Bristol (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/513,073

(22) Filed: Nov. 17, 2023

(65) Prior Publication Data
US 2024/0191633 A1 Jun. 13, 2024

(30) Foreign Application Priority Data

Dec. 13, 2022 (GB) ...................................... 2218684

(51) Int. Cl.
F01D 21/12 (2006.01)
F02C 7/268 (2006.01)

(52) U.S. Cl.
CPC .............. F01D 21/12 (2013.01); F02C 7/268 (2013.01); F05D 2270/3032 (2013.01)

(58) Field of Classification Search
CPC ...... F02C 7/32; F02C 7/36; F02C 7/14; F02C 7/224; F01D 21/00; F01D 21/003; F01D 21/06; F01D 21/12; F05D 2220/32; F05D 2260/20
See application file for complete search history.

(56) References Cited

U.S. PATENT DOCUMENTS

| 4,738,098 | A | 4/1988 | McMahon | |
|---|---|---|---|---|
| 9,151,182 | B2* | 10/2015 | Miller | F01D 25/26 |
| 10,563,590 | B2* | 2/2020 | Coldwate | F02C 3/04 |
| 10,823,075 | B2 | 11/2020 | Glahn et al. | |
| 11,187,156 | B2* | 11/2021 | Niergarth | B01D 19/0005 |
| 11,492,970 | B2 | 11/2022 | Rambo | |
| 11,913,376 | B2 | 2/2024 | Shinde et al. | |
| 2017/0234233 | A1 | 8/2017 | Schwarz et al. | |
| 2017/0301157 | A1* | 10/2017 | Descubes | G08B 5/22 |

(Continued)

FOREIGN PATENT DOCUMENTS

| DE | 10 2010 016 896 A1 | 12/2010 |
|---|---|---|
| EP | 1978214 A2 | 10/2008 |
| EP | 3246531 A1 | 11/2017 |

OTHER PUBLICATIONS

May 24, 2024 Search Report issued in European Patent Application No. 23209313.8.

(Continued)

Primary Examiner — Thuyhang N Nguyen
(74) Attorney, Agent, or Firm — Oliff PLC

(57) ABSTRACT

A method of operating a gas turbine engine having a spool includes executing, by a controller, a shutdown procedure. The shutdown procedure includes: performing an idle rotation operation; determining a parameter associated with a thermal condition of the gas turbine engine while the idle rotation operation is performed; determining, based on the determined parameter, whether the gas turbine engine has met a pre-determined criterion corresponding to a thermally stabilised condition; and terminating the idle rotation operation in response to a determination that the gas turbine engine has met the pre-determined criterion.

15 Claims, 4 Drawing Sheets

(56) References Cited

U.S. PATENT DOCUMENTS

| | | | |
|---|---|---|---|
| 2018/0016933 A1 | 1/2018 | Elbibary et al. | |
| 2020/0173372 A1 | 6/2020 | Mariotto et al. | |
| 2020/0200099 A1* | 6/2020 | Rajagopalan | F02C 9/42 |
| 2021/0172375 A1 | 6/2021 | Bosak et al. | |
| 2021/0285381 A1 | 9/2021 | Tomescu | |
| 2021/0301677 A1 | 9/2021 | Tomescu | |
| 2021/0301732 A1 | 9/2021 | Tomescu | |
| 2022/0195925 A1* | 6/2022 | Rambo | F02C 7/18 |

OTHER PUBLICATIONS

May 24, 2024 Search Report issued in European Patent Application No. 23209312.0.
Jun. 7, 2023 Search Report issued in British Patent Application No. 2218684.5.
Jun. 14, 2023 Search Report issued in British Patent Application No. 2218685.2.
U.S. Appl. No. 18/512,999, filed Nov. 17, 2023 in the name of David M Donnelly et al.
Oct. 24, 2024 Office Action issued in U.S. Appl. No. 18/512,999.
Mar. 12, 2025 U.S. Notice of Allowance issued in U.S. Appl. No. 18/512,999.

* cited by examiner

THERMAL SOAK-BACK MITIGATION

This disclosure claims the benefit of UK Patent Application No. GB2218684.5, filed on 13 Dec. 2022, which is hereby incorporated herein in its entirety.

TECHNICAL FIELD

This disclosure concerns methods of operating a gas turbine engine having a spool. This disclosure also concerns an apparatus including a gas turbine engine having a spool and a controller configured to carry out a method of operating the gas turbine engine. The methods described herein are generally directed to mitigation of thermal soak-back in a gas turbine engine.

BACKGROUND

Thermal soak-back is a known phenomenon which is associated with physical deterioration of internal components of gas turbine engines. When a spool of a gas turbine engine comes to rest (e.g., is stationary) following a shutdown, thermal inertia of heated components of the gas turbine engine such as a compressor disc and/or a turbine disc may lead to residual heat being transferred to other components of the gas turbine engine and/or into surrounding air cavities within the gas turbine engine. This may be referred to as thermal soak-back.

The residual heat transferred during thermal soak-back may detrimentally affect internal components of a gas turbine engine. For example, the residual heat may cause coking in fuel-carrying components, deterioration of seals, thermal stresses in component casings, thermal damage to sensitive electronic and/or electrical components, as well as compressor tip rubbing during a subsequent engine startup operation due to thermal expansion.

Poor management of thermal soak-back is associated with early degradation in engine performance as well as a need for a greater frequency of maintenance inspections or overhauls. It is therefore desirable to manage and mitigate thermal soak-back in gas turbine engines more effectively.

US 2018/016933 A1 describes a method and a system for soak-back mitigation in a gas turbine engine by means of active cooling. Apparatus for such active cooling includes specifically adapted ducts and powered fans to drive forced cooling by convection within the gas turbine engine. However, such apparatus is associated with an increased energy consumption, mass, size and/or complexity of a gas turbine engine.

SUMMARY

According to a first aspect of the present disclosure, there is provided a method of operating a gas turbine engine having a spool, the method comprising: executing, by a controller, a shutdown procedure which includes: performing an idle rotation operation; determining a parameter associated with a thermal condition of the gas turbine engine while the idle rotation operation is performed; determining, based on the determined parameter, whether the gas turbine engine has met a pre-determined criterion corresponding to a thermally stabilised condition; and terminating the idle rotation operation in response to a determination that the gas turbine engine has met the pre-determined criterion.

It may be that during performance of the idle rotation operation, a turbine of the gas turbine engine expands hot combustion products from a combustor to drive the spool to rotate. It may be that the idle rotation operation comprises continuously operating the gas turbine engine in an idle state. It may be that, during performance of the idle rotation operation, a turbine of the gas turbine engine expands hot combustion products from the combustor to drive the spool to rotate for self-sustaining operation of the gas turbine engine.

The shutdown procedure may be executed in response to: receipt of a shutdown demand signal; or a determination that a shutdown condition has been met.

It may be that executing the shutdown procedure further includes: following termination of the idle rotation operation, performing a cranked rotation operation; determining a parameter associated with a thermal condition of the gas turbine engine while the cranked rotation operation is performed; determining, based on the determined parameter, whether the gas turbine engine has met a further pre-determined criterion corresponding to a further thermally stabilised condition; terminating the cranked rotation operation in response to a determination that the gas turbine engine has met the further pre-determined criterion.

It may be that, during performance of the cranked rotation operation: an air turbine starter expands compressed air received from an external air source to drive the spool to rotate; a mechanical coupling with an external power source drives the spool to rotate; or an electric machine drives the spool to rotate.

The parameter associated with the thermal condition of the gas turbine engine may be: a monitored or predicted temperature at a location in the gas turbine engine; a monitored or predicted pressure at a location in the gas turbine engine; or a difference between a monitored or predicted temperature at a location in the gas turbine engine and a reference temperature. The reference temperature may be an ambient temperature or a temperature of an additional location in the gas turbine engine. Further, the parameter associated with the thermal condition of the gas turbine engine may be determined based on a signal received from a sensing arrangement.

It may be that wherein the gas turbine engine is provided with a thermal management system, and it may also be that executing the shutdown procedure further includes: performing a heat removal operation comprising controlling the thermal management system to cause heat to be removed from the gas turbine engine; and/or performing a heat redistribution operation comprising controlling the thermal management system to cause heat to be redistributed within the gas turbine engine.

Controlling the thermal management system to cause heat to be redistributed within the gas turbine engine may include transferring heat from a thermal source of the gas turbine engine to an internal thermal sink of the gas turbine engine. The thermal source may be a core of the gas turbine engine or a component of the core such as a combustor or turbine. The internal thermal sink may be a component of the engine outside of the core or a reservoir of fluid associated with the thermal management system such as oil or fuel.

It may be that the thermal management system includes a fluid pathway for circulating a coolant, wherein the fluid pathway is configured to prevent the coolant circulated therein from being discharged to ambient air. The thermal management system may include a vapour-compression refrigeration circuit. The thermal management system may include a thermal bus configured to transfer heat from a thermal source of the gas turbine engine to a process medium conveyed by the thermal bus. The thermal bus may be configured to reject heat from the process medium to an external medium. The external medium may be, for example, ambient air. It may be that the process medium is a fuel for combustion in a combustor of the gas turbine engine. Further, it may be that thermal bus is configured to circulate the fuel between a heat transfer location for heat transfer with the thermal source and a fuel tank, the heat transfer location being upstream of the fuel tank.

According to a second aspect of the present disclosure, there is provided a method of operating a gas turbine engine having a spool, the method comprising: executing, by a controller, a pre-shutdown procedure which includes: determining a parameter associated with a thermal condition of the gas turbine engine; and calculating an idle period for an idle rotation operation to be performed in a shutdown procedure; wherein calculation of the idle period is based on the determined parameter.

The pre-shutdown procedure may be executed in response to: receipt of a shutdown demand signal; or a determination that a shutdown condition has been met.

The idle period may be calculated as a duration of the idle rotation operation corresponding to the gas turbine engine meeting a pre-determined criterion corresponding to a thermally stabilised condition. The duration of the idle rotation operation corresponding to the gas turbine engine meeting the pre-determined criterion may be predictively calculated by reference to a model which relates the determined parameter to a variation in the thermal condition of the gas turbine engine with time during performance of the idle rotation operation.

The method of the second aspect may also comprise executing, by a controller, a shutdown procedure which includes: performing the idle rotation operation for the idle period.

It may be that, during performance of the idle rotation operation, a turbine of the gas turbine engine expands hot combustion products from a combustor to drive the spool to rotate. It may be that the idle rotation operation comprises continuously operating the gas turbine engine in an idle state. It may be that, during performance of the idle rotation operation, a turbine of the gas turbine engine expands hot combustion products from the combustor to drive the spool to rotate for self-sustaining operation of the gas turbine engine.

Executing the pre-shutdown procedure may further include: calculating a crank period for a cranked rotation operation to be performed in the shutdown procedure; wherein calculation of the crank period is based on the determined parameter.

The crank period may be calculated as a duration of the cranked rotation operation corresponding to the gas turbine engine meeting a further pre-determined criterion corresponding to a further thermally stabilised condition. The duration of the cranked rotation operation corresponding to the gas turbine engine meeting the further pre-determined criterion may be predictively calculated by reference to a model which relates the determined parameter to a variation in the thermal condition of the gas turbine engine with time during performance of the cranked rotation operation.

It may be that the idle period and the crank period are calculated so as to minimise a predicted energy consumption associated with execution of the shutdown procedure.

The idle period and the crank period may be calculated so as to minimise a total period of the idle period and the crank period or so that the total period of the idle period and the crank period is no greater than a total period target.

The idle period and the crank period may be calculated so as to minimise a predicted wear on or a predicted degradation of an internal component of the gas turbine engine associated with execution of the shutdown procedure.

The method of the second aspect may also comprise executing, by a controller, a shutdown procedure which includes: performing the idle rotation operation for the idle period; performing the cranked rotation operation for the crank period; wherein the idle rotation operation is performed prior to the cranked rotation operation.

It may be that, during performance of the cranked rotation operation: an air turbine starter expands compressed air received from an external air source to drive the spool to rotate; a mechanical coupling with an external power source drives the spool to rotate; or an electric machine drives the spool to rotate.

It may be that the gas turbine engine is provided with a thermal management system, and it may also be that executing the shutdown procedure further includes: performing a heat removal operation comprising controlling the thermal management system to cause heat to be removed from the gas turbine engine; and/or performing a heat redistribution operation comprising controlling the thermal management system to cause heat to be redistributed within the gas turbine engine.

Controlling the thermal management system to cause heat to be redistributed within the gas turbine engine may include transferring heat from a thermal source of the gas turbine engine to an internal thermal sink of the gas turbine engine. The thermal source may be a core of the gas turbine engine or a component of the core such as a combustor or turbine. The internal thermal sink may be a component of the engine outside of the core or a reservoir of fluid associated with the thermal management system such as oil or fuel.

It may be that the thermal management system includes a fluid pathway for circulating a coolant, wherein the fluid pathway is configured to prevent the coolant circulated therein from being discharged to ambient air. The thermal management system may include a vapour-compression refrigeration circuit. The thermal management system may include a thermal bus configured to transfer heat from a thermal source of the gas turbine engine to a process medium conveyed by the thermal bus. The thermal bus may be configured to reject heat from the process medium to an external medium. The external medium may be, for example, ambient air. It may be that the process medium is a fuel for combustion in a combustor of the gas turbine engine. Further, it may be that thermal bus is configured to circulate the fuel between a heat transfer location for heat transfer with the thermal source and a fuel tank, the heat transfer location being upstream of the fuel tank.

Executing the pre-shutdown procedure may further include: calculating a TMS period for the heat redistribution operation and/or the heat removal operation to be performed in the shutdown procedure; wherein calculation of the TMS period is based on the determined parameter.

Additionally or alternatively, executing the pre-shutdown procedure may further comprise: selecting a TMS operating setting in which the thermal management system is to be operated to perform the heat removal operation and/or to perform the heat redistribution operation in the shutdown procedure; wherein selection of the operating setting is based on: the determined parameter; and/or an availability of the thermal management system for cooling; and wherein the operating setting is selected from a group consisting of: a selected control setting for a flow control device of the thermal management system; a selected thermal source of the gas turbine engine; and a selected thermal sink for the thermal management system.

In addition or instead, executing the pre-shutdown procedure may further comprise: selecting an idle operating setting in which the gas turbine engine is to be operated to perform the idle rotation operation in the shutdown procedure based on the operating parameter; wherein the idle operating setting is selected from a group consisting of: a selected rotational speed setting for a spool of the gas turbine engine; and a selected setting of a variable-geometry internal component of the gas turbine engine.

Additionally or alternatively, executing the pre-shutdown procedure may further comprise: selecting a crank operating setting in which the gas turbine engine is to be operated to perform the cranked rotation operation in the shutdown procedure based on the operating parameter; wherein the crank operating setting is selected from a group consisting of: a selected rotational speed setting for a spool of the gas turbine engine; and a selected setting of a variable-geometry internal component of the gas turbine engine.

The parameter associated with thermal condition of the gas turbine engine may be: a monitored or predicted temperature at a location in the gas turbine engine; a monitored or predicted pressure at a location in the gas turbine engine; or a difference between a monitored or predicted temperature at a location in the gas turbine engine and a reference temperature. The reference temperature may be an ambient temperature or a temperature of an additional location in the gas turbine engine. The parameter associated with the thermal condition of the gas turbine engine may be determined based on a signal received from a sensing arrangement. Alternatively, the parameter associated with the thermal condition of the gas turbine engine may be predictively determined based on operating information relating to: historical usage data of the gas turbine engine; internal sensor data of the gas turbine engine; and/or ambient environment data.

According to a third aspect of the present disclosure, there is provided an apparatus including: a gas turbine engine having a spool; and a controller configured to carry out the method of the first aspect or the method of the second aspect.

According to a fourth aspect of the present disclosure, there is provided a non-transitory machine readable medium comprising instructions which, when executed by the controller of the apparatus of the third aspect, cause the controller to carry out the method of the first aspect or the method of the second aspect.

The methods disclosed herein are generally associated with improved management and mitigation of thermal soak-back in gas turbine engines. As a result, the methods of the present disclosure may be associated with reduced degradation of gas turbine engine performance and/or a reduced frequency of maintenance inspections or overhauls. Specifically, the disclosed methods may aid mitigation of detrimental effects of thermal soak-back in gas turbine engines including, but not limited to, coking in fuel-carrying components, deterioration of seals, thermal stresses in component casings, thermal damage to sensitive electronic and/or electrical components, and/or compressor tip rubbing during an engine startup.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
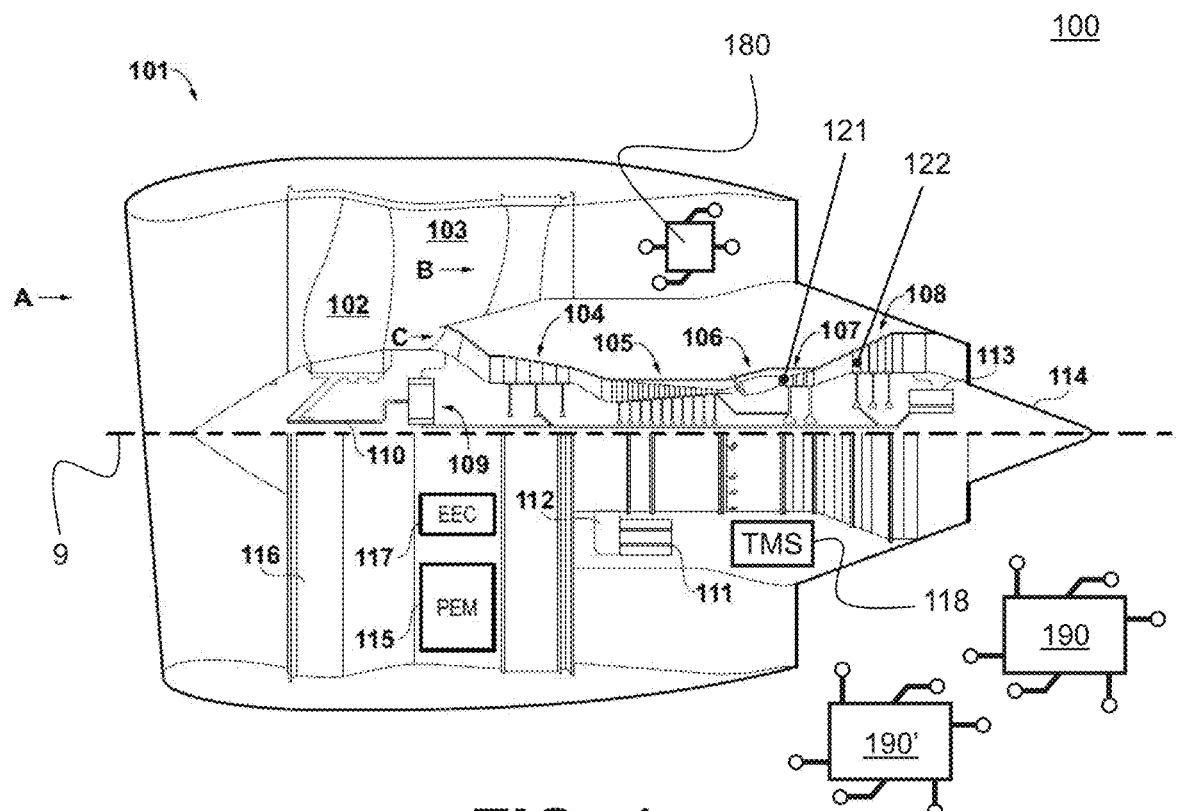
FIG. 1 shows a general arrangement of a turbofan engine for an aircraft.

A general arrangement of an engine 101 for an aircraft is shown in FIG. 1. The engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the low-pressure turbine 108 via a reduction gearbox in the form of a planetary configuration epicyclic gearbox 109. Thus, in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static, and the ring gear rotates and provides the output) may be used instead, and indeed that the gearbox 109 may be omitted entirely so that the fan 102 is driven directly by the low-pressure turbine 108.

It is increasingly desirable to facilitate a greater degree of electrical functionality on the airframe and on the engine. To this end, the engine 101 of the present embodiment comprises one or more rotary electric machines, generally capable of operating both as a motor and as a generator. The number and arrangement of the rotary electric machines will depend to some extent on the desired functionality. Some embodiments of the engine 101 include a single rotary electric machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electric machine 111 coupled with the high-pressure spool and a second rotary electric machine 113 coupled with the low-pressure spool. In addition to generating electrical power and the starting the engine 101, having both first and second rotary machines 111, 113, connected by power electronics, can facilitate the transfer of mechanical power between the high and lower pressure spools to improve operability, fuel consumption etc.

As mentioned above, in FIG. 1 the first rotary electric machine 111 is driven by the high-pressure spool by a core-mounted accessory drive 112 of conventional configuration. In alternative embodiments, the first electric machine 111 may be mounted coaxially with the turbomachinery in the engine 101. For example, the first electric machine 111 may be mounted axially in line with the duct between the low- and high-pressure compressors 104 and 105. In FIG. 1, the second electric machine 113 is mounted in the tail cone 114 of the engine 101 coaxially with the turbomachinery and is coupled to the low-pressure turbine 108. In alternative embodiments, the second rotary electric machine 113 may be located axially in line with low-pressure compressor 104, which may adopt a bladed disc or bladed drum configuration to provide space for the second rotary electric machine 113. It will of course be appreciated by those skilled in the art that any other suitable location for the first and (if present) second electric machines may be adopted.

The first and second electric machines 111, 113 are connected with power electronics. Extraction of power from or application of power to the electric machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electric machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e., both of the core gas turbine and the first and second electric machines 111 and 113. In this way, the EEC 117 may holistically respond to both thrust demand and electrical power demand.

The one or more rotary electric machines 111, 113 and the power electronics 115 may be configured to output to or receive electric power from one, two or more dc busses. The dc busses allow for the distribution of electrical power to other engine electrical loads and to electrical loads on the airframe. The dc busses may further receive electrical power from, or deliver electrical power to, an energy storage system such as one or more battery modules or packs.

Those skilled in the art will appreciate that the gas turbine engine 101 described above may be regarded as a 'more electric' gas turbine engine because of the increased role of the electric machines 111, 113 compared with those of conventional gas turbines.

In FIG. 1, the high-pressure spool is denoted by 121 whereas the low-pressure spool is denoted by 122. The high-pressure spool 121 and/or the low-pressure spool 122 may be more simply referred to as the spool 121, 122 of the gas turbine engine 101 herein. Consequently, references herein to the spool of the gas turbine engine 101 may apply to either the high-pressure spool 121 or the low-pressure spool 122. FIG. 1 shows an apparatus 100 comprising a controller 190 and the gas turbine engine 101. The controller 190 is configured to carry out a method of operating the gas turbine engine 101, as discussed in further detail below with reference to FIGS. 4-6. The apparatus 190 may also comprise a sensing arrangement 180, as also discussed in further detail below.

The gas turbine engine 101 is operable in an idle state. The controller 190 may selectively cause the gas turbine engine to be operated in the idle state. Accordingly, the controller 190 is configured to selectively perform an idle rotation operation, wherein the idle rotation operation comprises continuously operating the gas turbine engine 101 in the idle state. During performance of the idle rotation operation (that is, when the gas turbine engine is operated in the idle state), a turbine 107, 108 of the gas turbine engine 101 expands hot combustion products from the combustor 106 to drive the spool 121, 122 to rotate for self-sustaining operation of the gas turbine engine 101. Self-sustaining operation of the gas turbine engine 101 refers to the spool 121, 122 of the gas turbine engine 101 being rotated by the turbine without assistance from, for instance, an electric machine 111, 113 or an air turbine starter. When the gas turbine engine is operated in the idle state, a rate of combustion of fuel in the combustor 106 is low compared to a rate of combustion of fuel in the combustor 106 when the gas turbine engine 101 is operated in a thrust-generating state (e.g., for flight). In particular, idle state operation is understood to correspond to the rate of combustion of fuel in the combustor 106 is the minimum rate of combustion of fuel in the combustor 106 which permits self-sustaining operation of the gas turbine engine 101. As a result, a heat generation rate within the combustor 106, the compressors 104, 105 and/or the turbines 107, 108 when the gas turbine engine 101 is operated in the idle state is lower than a heat generation rate within the combustor 106, the compressors 104, 105 and/or the turbines 107, 108 when the gas turbine engine 101 is operated in a thrust-generating state. Therefore, operation of the gas turbine engine 101 in the idle state after the gas turbine engine 101 has recently been operated in the thrust-generating state generally results in cooling of the gas turbine engine 101 with time.

The gas turbine engine 101 is also operable in a cranked state. In a similar way to that described above with reference to the idle state, the controller 190 is configured to selectively cause the gas turbine engine to be operated in the cranked state. Accordingly, the controller 190 is configured to selectively perform a cranked rotation operation, wherein the cranked rotation operation comprises continuously or intermittently operating the gas turbine engine 101 in the cranked state. During performance of the cranked rotation operation (that is, when the gas turbine engine is operated in the cranked state), the spool 121, 122 is not exclusively driven to rotate by the turbine 107, 108 of the gas turbine engine 101 expanding hot combustion products from the combustor 106. Instead, the spool 121, 122 may be at least partially or only driven to rotate by an electric machine (e.g. the first rotary electric machine 111 or the second rotary electric machine 113 described above) during the cranked rotation operation. Additionally, or alternatively, the spool 121, 122 may be at least partially or only driven to rotate by an air turbine starter expanding compressed air received from an external air source (e.g. ground starting equipment or a cross-bleed system in fluid communication with another gas turbine engine) during the cranked rotation operation. Those skilled in the art will be familiar with air turbine starters and suitable means for incorporating an air turbine stater for the gas turbine engine 101. Further, in addition or instead, the spool 121, 122 may be at least partially or only driven to rotate by a mechanical coupling with an external power source (e.g. another gas turbine engine or a power source of an aircraft to which the gas turbine engine 101 is provided, such as an auxiliary power unit). It follows that a heat generation rate within the combustor 106, the compressors 104, 105 and/or the turbines 107, 108 when the gas turbine engine 101 is operated in the cranked state is lower than a heat generation rate within the combustor 106, the compressors 104, 105 and/or the turbines 107, 108 when the gas turbine engine 101 is operated in the idle state. Therefore, operation of the gas turbine engine 101 in the cranked state after the gas turbine engine 101 has recently been operated in the idle state and/or the power-generating state generally results in cooling of the gas turbine engine 101.

Further, operation of the gas turbine engine 101 in the cranked state may result in more rapid cooling of the gas turbine engine 101 and/or cooling of the gas turbine engine 101 to a lower final temperature than operation of the gas turbine engine 101 in the idle state after the gas turbine engine 101 has been recently operated in the power-generating state. The rate of cooling may depend on a rate at which a spool is driven to rotate, a corresponding flow rate of air through the gas turbine engine to discharge or dissipate heat and/or ambient environment conditions.

The gas turbine engine 101 is provided with a thermal management system (TMS) 118. As shown in the example of FIG. 1, the TMS 118 may be disposed inside the gas turbine engine 101 such that the TMS 118 is internal to the gas turbine engine 101. In other examples, the TMS 118 may be disposed at least partially outside the gas turbine engine 101 such that the TMS 118 is at least partially external to the gas turbine engine 101. The TMS 118 is generally configured to remove heat from the gas turbine engine 101 and/or redistribute heat within the gas turbine engine 101. The TMS 118 is configured to transfer heat from a thermal source of the gas turbine engine 101 to a thermal sink. The thermal sink may be internal to or external to the gas turbine engine 101. Depending on whether the thermal sink is an internal thermal sink or an external thermal sink, the TMS 118 is configured to either remove heat from the gas turbine engine 101 or redistribute heat within the gas turbine engine 101. The TMS 118 may primarily be used for transferring heat from the thermal source to the thermal sink while the gas turbine engine 101 is in the thrust-generating state, but according to the present disclosure is also configured and operable to transfer heat from the thermal source to the thermal sink while the gas turbine engine 101 is in the idle state and/or the cranked state. The TMS 118 is suitable for managing thermal loads in a variety of operating states of the gas turbine engine 101. The TMS 118 includes a fluid pathway for circulating a coolant. The coolant may be a fluid other than air. The fluid pathway is a closed circuit, and as such is configured to prevent the coolant circulated therein in use from mixing with, or being discharged to, ambient air. More particularly, the fluid pathway may be a vapour-compression refrigeration circuit (as described below with reference to FIG. 2) or a thermal bus (as described below with reference to FIG. 3).

Removing heat from the gas turbine engine 101 includes transferring heat from a thermal source of the gas turbine engine 101 to an external thermal sink (e.g., an external medium). The external thermal sink may be, for example, ambient air. Similarly, redistributing heat within the gas turbine engine 101 includes transferring heat from a thermal source of the gas turbine engine 101 to an internal thermal sink of the gas turbine engine 101 (e.g., an internal medium). The internal thermal sink may be, for instance, a component of the engine outside of the core or a reservoir of, or circulating flow of, fluid associated with the TMS 118 such as oil or fuel. The thermal source of the gas turbine engine 101 may be, for example, a core of the gas turbine engine 101 or a component of the core such as a compressor disc (e.g., the low-pressure compressor 104 or the high-pressure compressor 105), a combustor (e.g., the combustor 106) or a turbine disc (e.g., the high-pressure turbine 107 or the low-pressure turbine 108). Further, the thermal source(s) of the gas turbine engine 101 may be, for instance, engine-mounted or engine proximal accessories such as control units and/or electrical/electronic components which require cooling so as to be protected from the possible thermal damage due to thermal soak-back from, for example, the core of the gas turbine engine 101 or a component of the core such as a compressor disc.

Figure 2:
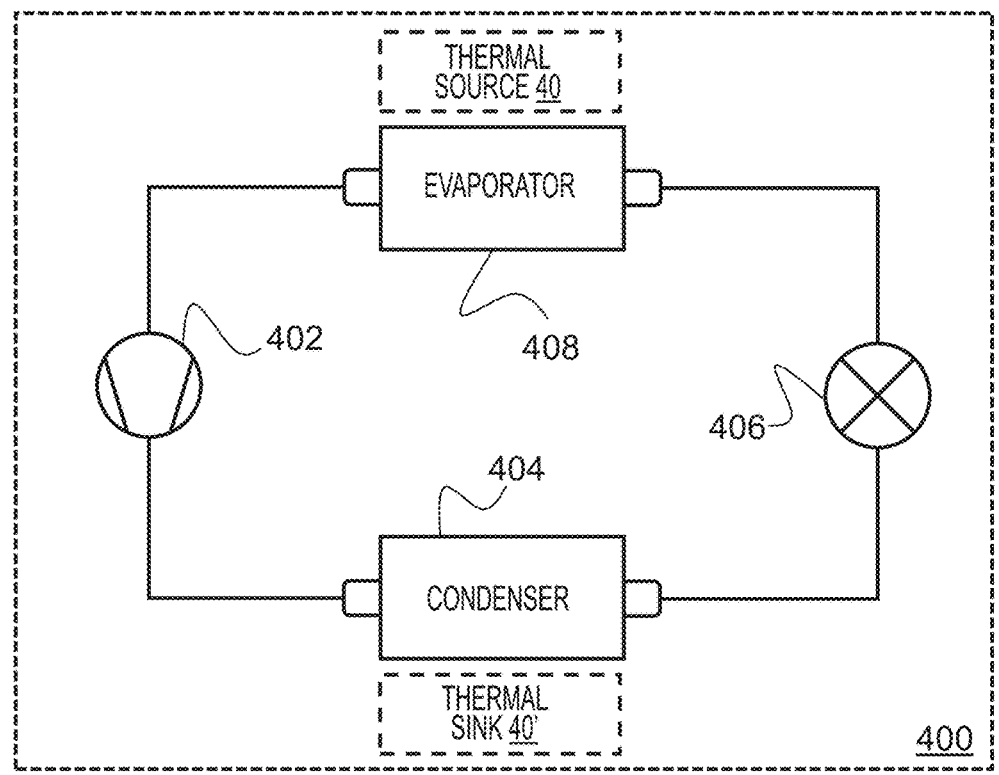
FIG. 2 shows, schematically, a first example thermal management system suitable for use in the gas turbine engine of FIG. 1.

FIG. 2 shows a first example TMS 118 suitable for use within the gas turbine engine 101 of FIG. 1. The first example TMS 118 comprises a vapour-compression refrigeration circuit 400. The vapour-compression refrigeration circuit 400 includes an evaporator 408 which is configured to receive heat from the thermal source 40 of the gas turbine engine 101 and a condenser 404 which is configured to reject heat to the thermal sink 40' (e.g., the internal thermal sink or the external thermal sink as discussed above). For these purposes, the vapour-compression refrigeration circuit also includes compression apparatus 402 (e.g., a compressor 402) and expansion apparatus 406 (e.g., an expansion valve 406). Accordingly, the vapour-compression refrigeration circuit 400 may be controlled to cause heat to be redistributed within the gas turbine engine 101 and/or to cause heat to be removed from the gas turbine engine 101. The vapour-compression refrigeration circuit 400 may be controlled by any number of suitable control methods, as will be apparent to those skilled in the art.

Figure 3:
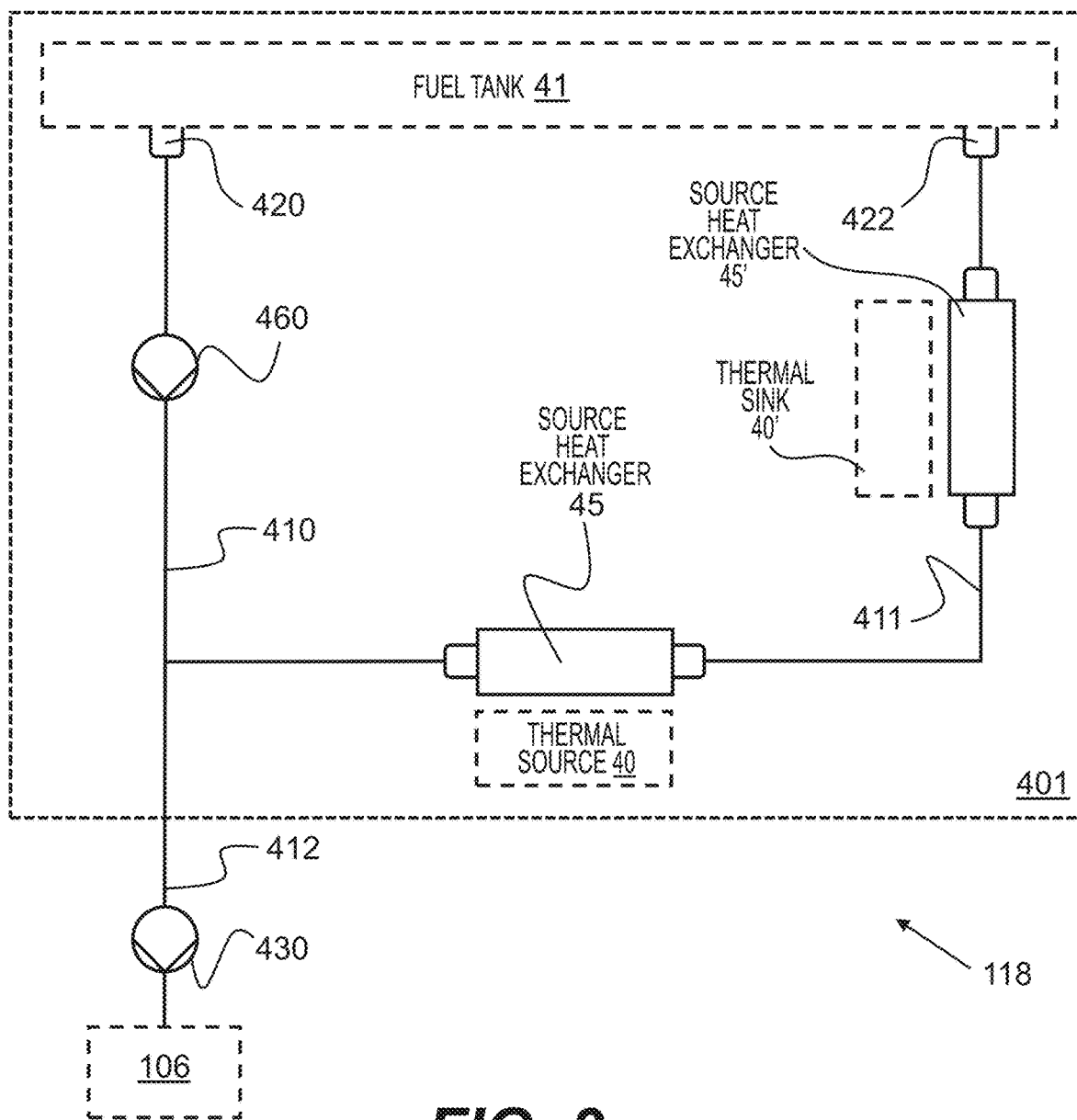
FIG. 3 shows, schematically, a second example thermal management system suitable for use in the gas turbine engine of FIG. 1.

FIG. 3 shows a second example TMS 118 suitable for use within the gas turbine engine 101 of FIG. 1. The second example TMS 118 includes a thermal bus 401 configured to transfer heat from the thermal source 40 of the gas turbine engine 101 to a process medium (e.g., a coolant) conveyed by the thermal bus. In use, the transfer of heat from the thermal source 40 to the process medium occurs at a source heat transfer location within the thermal bus 401. In the example of FIG. 3, the source heat transfer location is a source heat exchanger 45. The thermal bus 401 is configured to reject heat from the process medium to the thermal sink 40' at a sink heat transfer location within the thermal bus 401. In the example of FIG. 3, the sink heat transfer location is a source heat exchanger 45'. As described above with respect to FIG. 2, the thermal sink 40' may be an external thermal sink (e.g., an external medium, such as ambient air)

or an internal thermal sink. Each of the heat exchangers 45, 45' are configured to promote heat exchange between the thermal source 40 and the thermal sink 40', respectively, as will be understood by the those skilled in the art.

The process medium conveyed by the thermal bus 401 may be a fuel suitable for combustion in the combustor 106 of the gas turbine engine 101, as in the example of FIG. 3. In particular, the thermal bus may be configured to circulate the fuel between the source heat transfer location (in the source heat exchanger 45) and a fuel tank 41. The fuel tank 41 may be either internal or external to the gas turbine engine 101. In the example of FIG. 3, the thermal bus 401 is adapted to receive fuel from the fuel tank 41 at a fuel inlet 420 and to convey fuel from the fuel inlet 420 to the source heat exchanger 45 via a fuel supply line 410. The thermal bus 401 is also adapted to return fuel to the fuel tank 41 at a fuel outlet 422 via a fuel return line 411. A circulation pump 460 is provided for causing fuel to be circulated from the fuel inlet 420 to the fuel outlet 422 via the fuel supply line 410 and the fuel return line 411.

Figure 4:
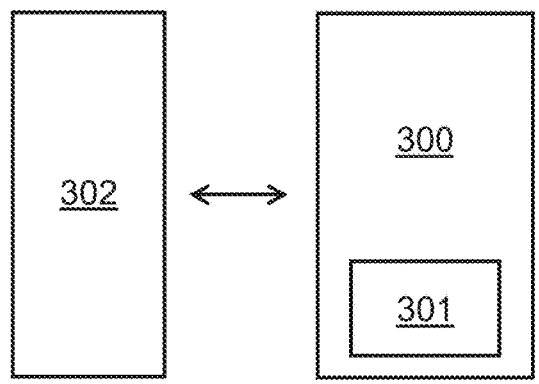
FIG. 4 shows, schematically, a non-transitory machine-readable medium comprising instructions which, when executed by a controller, cause the controller to carry out a method of operating the gas turbine engine of FIG. 1.

Accordingly, the source heat transfer location 45 is upstream of the fuel tank 41 such that fuel which has received heat from the thermal source 40 at the heat transfer location 45 is then circulated to the fuel tank 41 by the thermal bus 401. In addition, the thermal bus 401 receives the fuel from the fuel tank 41 at a location upstream of the source heat transfer location 45, such that the thermal bus 401 is configured to circulate fuel from the fuel tank 41 to the source heat transfer location 45 prior to returning the fuel to the fuel tank 41. The second example TMS 118 may therefore be described as comprising a fuel-return-to-tank (FRTT) system. In the example of FIG. 3, the thermal bus 401 is in fluid communication with a combustor line 412 which is configured to convey fuel from the fuel supply line 410 to the combustor 106 of the gas turbine engine 101. A combustor pump 430 is provided on the combustor line 412 for causing fuel to be supplied to the combustor 106 along the combustor line 412. This arrangement enables the TMS 118 to be integrated within a fuel delivery system of the gas turbine engine 101, which may in turn reduce a complexity of the gas turbine engine 101 and/or a weight penalty associated with the inclusion of the TMS 118. FIG. 4 shows, schematically, a non-transitory machine readable medium 300 comprising instructions 301 which, when executed by a processor 302, such as a processor of the controller 190 of the apparatus 100 of FIG. 1, cause the processor to carry out the method of operating the gas turbine engine 101. The method of operating the gas turbine engine 101 carried out by the controller 190 may be in accordance with either of the example methods described below with reference to FIGS. 5 and 6.

Both of the example methods include the controller 190 determining a parameter associated with (e.g., indicative of) a thermal condition of the gas turbine engine 101. The parameter may be a thermal property. The parameter may be any suitable thermodynamic or thermofluidic property (e.g., a thermal property) associated with the gas turbine engine 101. The expression thermofluidic as used herein is intended to denote a parameter relating to either a temperature of a component or fluid, or a property of a flow of a fluid (e.g., pressure or flow rate).

In particular, the parameter may be a temperature or a pressure at an internal location in the gas turbine engine 101. The internal location may be on or within a component of the core or the bypass duct 103 of the gas turbine engine 101, such that the parameter is a temperature of the component of the gas turbine engine 101. Otherwise, the internal location may be proximal to a component of the core or the bypass duct 103 of the gas turbine engine 101, such that the parameter corresponds to an air temperature or an air pressure proximal to the component of the gas turbine engine 101. For instance, the internal location may be within an air cavity of the gas turbine engine 101. In particular, the component may be a rotor of the gas turbine engine 101 (e.g., a disc of the low-pressure compressor 104, a disc of the high-pressure compressor 105, a disc of the high-pressure turbine 107, or a disc of the low-pressure turbine 108).

If the parameter is a temperature, the internal location may be such that the temperature corresponds to: a compressor 104, 105 entry temperature; a compressor 104, 105 exit temperature, a turbine 107, 108 entry temperature, a turbine 107, 108 exit temperature; a compressor 104, 105 blade temperature (rotor or vane); a turbine 104, 105 blade temperature (rotor or vane); a combustor 106 discharge temperature; a bypass duct 103 temperature; a spool 121, 122 temperature (corresponding to a monitoring location on a spool 121, 122, for example a monitoring location on a shaft of the spool 121, 122); a lubricant temperature (e.g. an oil temperature); a fuel temperature; a coolant temperature. Reference numerals in this paragraph indicate suitable locations for respective temperature sensors within the gas turbine engine 101, as shown in FIG. 1.

If the parameter is a pressure, the internal location may be at, for example, an engine inlet (e.g., a fan inlet), a compressor 104, 105 inlet, a compressor 104, 105 outlet, a combustor 106 outlet, a turbine 107 inlet, or a turbine 108 outlet. The pressure at such internal locations are considered to relate to air flow through the gas turbine engine 101 in that the pressures at various locations in the gas turbine engine 101 is a function of the air flow through the gas turbine engine 101. As will be appreciated by those skilled in the art, the characteristics of the air flow through the gas turbine engine 101 may be generally indicative of the thermal condition of the gas turbine engine 101. Therefore, the pressure at the internal location may be indicative of the thermal condition of the gas turbine engine 101. Further, a model as discussed herein may utilise one or more monitored pressures (e.g., in conjunction with one or more other monitored parameters, such as temperatures) to inform a thermal model of the gas turbine engine, and the thermal model may be used to determine a parameter associated with a thermal condition of the gas turbine engine, for example a predicted temperature of a component, temperature distribution, or temperature difference between components.

It may be that the parameter is a difference between the temperature at the internal location in the gas turbine engine 101 and a reference temperature. The reference temperature may be an ambient temperature (that is, a temperature of air external to the gas turbine engine 101). Otherwise, the reference temperature may be a temperature at an additional internal location in the gas turbine engine 101. In an example, it may be that the internal location is positioned on or within a component of the gas turbine engine 101 relatively proximal to a rotational axis 9 thereof and the additional internal location is positioned on or within the component of the gas turbine engine 101 relatively distal to the rotational axis 9 (see FIG. 1).

The controller 190 may determine the parameter based on a signal received from the sensing arrangement 180. The sensing arrangement 180 may comprise transducers adapted to monitor, for example, the temperature or the pressure at the internal location of the gas turbine engine 101 and optionally at the additional internal location of the gas turbine engine as described above. Accordingly, the signal provided to the controller 190 may directly correspond to the monitored temperature and/or the monitored pressure at the internal location in the gas turbine engine 101. Otherwise, the sensing arrangement 180 may comprise transducers adapted to monitor, for example, an alternative property at the internal location of the gas turbine engine 101 and optionally at the additional internal location of the gas turbine engine. The alternative property is a property other than the temperature or the pressure at the internal location of the gas turbine engine 101 but which is related to the temperature or the pressure at the internal location. For instance, the alternative property may be a bulk fluid velocity at the internal location (e.g., due to free convection within an air cavity of the gas turbine engine 101) or a strain at the internal location (e.g., due to thermal expansion of a component of the gas turbine engine 101). Further, the alternative property may be a separation distance between different components, which may change due to thermal expansion. The location of the separation distance (e.g., a gap) may be an internal location consistent with the above discussion. Otherwise, the alternative property may be separation distance between an internal location of the gas turbine engine 101 and an additional internal location of the gas turbine engine 101, and which may change due to thermal expansion, with the internal location and additional internal location being positioned on or within different components. The signal provided to the controller 190 may indirectly correspond to the temperature and/or the pressure at the internal location in the gas turbine engine 101 and, in use, the controller 190 may determine a predicted temperature or a predicted pressure at the internal location of the gas turbine engine 101 and optionally at the additional internal location of the gas turbine engine 101 based on the signal provided to the controller 190. Suitable transducers for these purposes will be apparent to those skilled in the art.

Figure 5:
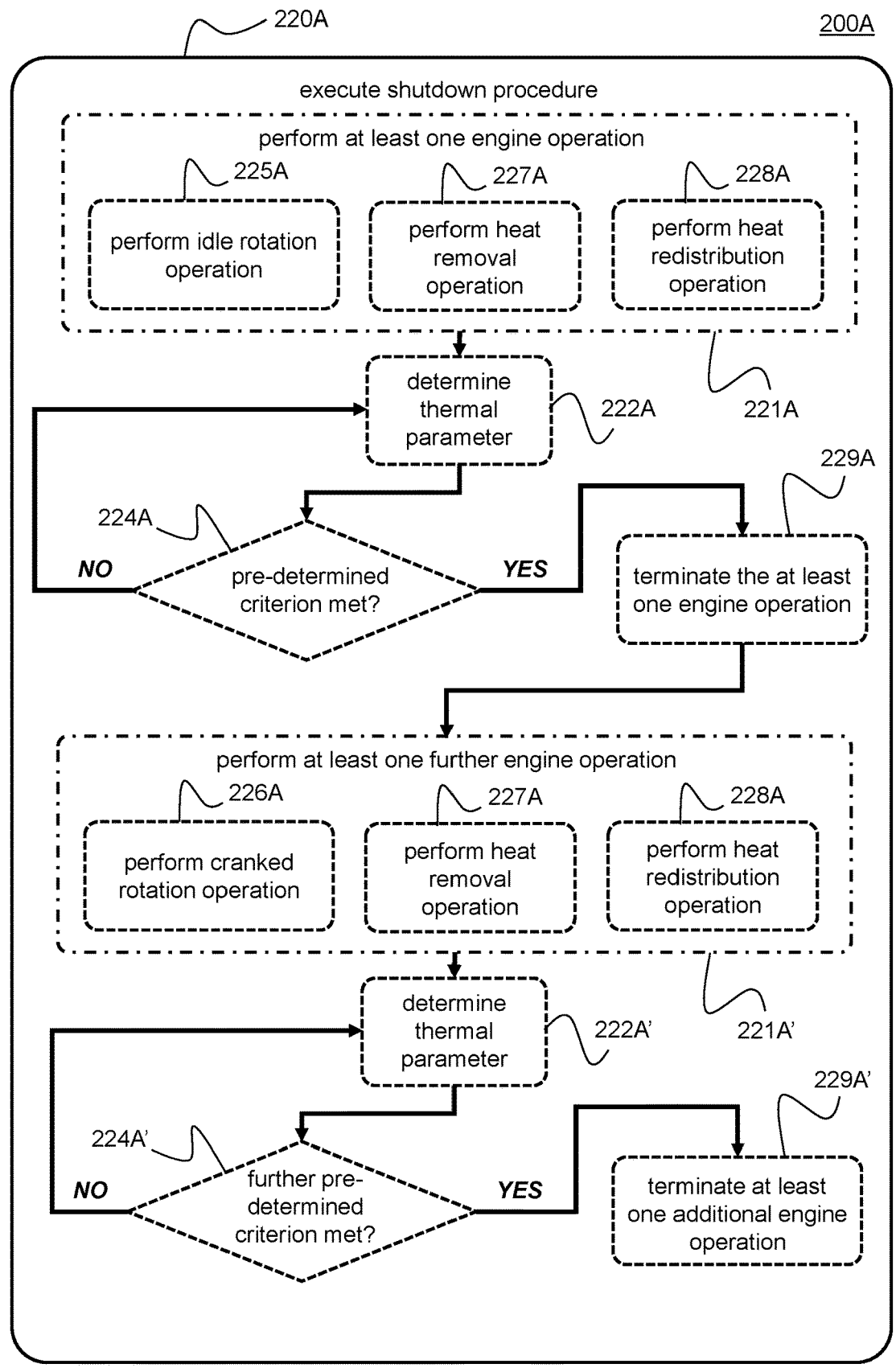
FIG. 5 is a flowchart which shows a first example method of operating the gas turbine engine of FIG. 1.

FIG. 5 is a flowchart which shows a first example method 200A of operating the gas turbine engine 101 described above with respect to FIG. 1. The first example method 200A includes, at block 220A, executing a shutdown procedure of the gas turbine engine 101. Execution 220A of the shutdown procedure may be initiated in response to receipt of a shutdown demand signal from an external data processing apparatus such as, for example, an avionics system of an aircraft to which the gas turbine engine 101 is provided. Otherwise, execution 220A of the shutdown procedure of the gas turbine engine 101 may be initiated in response to the controller 190 determining that a shutdown condition has been met. The controller 190 may determine that the shutdown condition has been met based on a rotational speed of a spool 121, 122 of the gas turbine engine and/or information relating to whether the gas turbine engine 101 may be safely shut down. For instance, the shutdown condition may be determined to have been met when the rotational speed of the spool 121, 122 is below a lower speed threshold, a rate of change of the rotational speed of the spool 121, 122 is negative (that is, the rotational speed of the spool 121, 122 is decreasing with time) and/or information relating to whether an aircraft in which the gas turbine engine is incorporated is stationary and/or not in flight (e.g. a landed signal from a device within a landing gear arrangement has been received by the controller 190, the landed signal being indicative of the aircraft being on the ground).

Executing 220A the shutdown procedure includes, in block 221A, performing at least one engine operation. The at least one engine operation includes at least block 225A, which comprises performing the idle rotation operation of the gas turbine engine 101 as described above. In addition to the idle rotation operation represented by block 225A, the at least one engine operation may further comprise a heat removal operation represented by block 227A and/or further comprise a heat redistribution operation represented by block 228A. If the at least one engine operation comprises both the heat removal operation and the heat redistribution operation, these operations may be performed concurrently, sequentially, or at least partially concurrently and at least partially sequentially.

The heat removal operation includes controlling the TMS 118 to cause heat to be removed from the gas turbine engine 101 as described above with reference to FIGS. 1-3. Similarly, the heat removal operation includes controlling the TMS to cause heat to be redistributed within the gas turbine engine 101 as also described above with reference to FIGS. 1-3.

In executing 220A the shutdown procedure, the method 200A proceeds to determining, at block 222A, the parameter associated with the thermal condition of the gas turbine engine 101. The controller 190 may determine the parameter in accordance with the techniques described above. After the parameter has been determined, the method 200A then proceeds to determining, at block 224A, whether the gas turbine engine 101 has met a pre-determined criterion corresponding to a thermally stabilised condition. The determination of whether the gas turbine engine 101 has met the pre-determined criterion at block 224A is based on the parameter determined at block 222A, as explained in further detail below. The method 200A includes continuing to perform the at least one engine operation at block 221A whilst the parameter is determined at block 222A and also whilst the determination is made at block 224A.

The at least one engine operation is terminated in response to a determination being made (at block 224A) that the gas turbine engine 101 has met the pre-determined criterion at block 229A. Conversely, if a determination is made (at block 224A) that the gas turbine engine 101 has not met the pre-determined criterion at block 229A, the method 200A returns to block 222A such that the parameter is determined again. The method then continues to block 224A as described above such that the determination of whether the gas turbine engine 101 has met the pre-determined criterion is also made again. The at least one engine operation is continued to be performed as the determination of the parameter and the determination of whether the gas turbine engine 101 has met the pre-determined criterion, respectively, are made again.

Accordingly, until a determination is made (in block 224A) that the gas turbine engine 101 has met the pre-determined criterion, the parameter is repeatedly determined over time as the method 200A repeatedly proceeds through a loop formed between blocks 222A and 224A. It follows that the parameter is repeatedly determined at discrete intervals in time. The method 200A may also include a loop counter and/or a loop interrupter (not shown) to prevent the loop from becoming an infinite loop if no determination is made that the pre-determined criterion has been met after, for instance, a pre-selected time duration has elapsed since execution of the shutdown procedure was initiated and/or the parameter has been determined a pre-selected number of times.

The gas turbine engine 101 is generally determined to have met the pre-determined criterion when the parameter associated with the thermal condition of the gas turbine engine 101 falls below a thermal stabilisation threshold. For example, if the parameter is the temperature at the internal location in the gas turbine engine 101 or a difference between the temperature at the internal location in the gas turbine engine 101 and the reference temperature, the predetermined criterion may be determined to have been met when the temperature (or the difference between temperatures) falls below a temperature value threshold or when the rate of change of the temperature falls below a temperature rate-of-change threshold (or a temperature-difference value threshold or a temperature-difference rate-of-change threshold). Otherwise, if the parameter is a pressure at the internal location in the gas turbine engine 101, the thermal stabilisation threshold may be a corresponding pressure value threshold.

The thermal stabilisation threshold may be chosen as being indicative of the thermal condition of the gas turbine engine 101 being such that a risk of detrimental effects associated with thermal soak-back in the gas turbine engine 101 has been sufficiently reduced to allow the idle rotation operation to be terminated. The thermal stabilisation threshold may be a pre-determined value stored in a memory of the controller 490, for example a fixed (e.g. read-only) value, or a re-writable pre-determined value which is updated based on, for instance, the thermal condition of the gas turbine engine upon initiation of execution 220A of the shutdown procedure (e.g. updated based on the thermal parameter of the gas turbine engine 10 as first determined during at block 222A after execution 220A of the shutdown procedure is initiated). As an example, if the parameter is the temperature at the internal location in the gas turbine engine 101, the thermal stabilisation threshold may be chosen as a temperature value threshold corresponding to a temperature at the internal location of the gas turbine engine 101 which is indictive of the internal components of the gas turbine engine 101 having been sufficiently cooled during performance 225A of the idle rotation process to allow the idle rotation process to be terminated without a risk of detrimental thermal soak-back following termination of the idle rotation process being unacceptably high.

Additionally, or alternatively, the thermal stabilisation threshold may be chosen as being indicative of the thermal condition being sufficiently stable (with respect to time) that continued performance 225A of the idle rotation process is unlikely to result in significant additional cooling of the internal components of the gas turbine engine. As an example, if the parameter is the temperature at the internal location in the gas turbine engine 101, the thermal stabilisation threshold may be chosen as a temperature rate-of-change threshold corresponding to a temperature rate-of-change at the internal location of the gas turbine engine 101 which is indictive of the internal components of the gas turbine engine 101 not being subject to significant cooling by performance 225A of the idle rotation process (e.g. as compared with a prior rate of cooling).

The present disclosure envisages that the method 200A may terminate at block 229A. However, optionally, the method 200A may continue to block 221A', which includes performing at least one further engine operation. The at least one further engine operation includes at least block 226A, which comprises performing the cranked rotation operation of the gas turbine engine 101 as described above. In addition to the cranked rotation operation represented by block 226A, the at least one further engine operation may further comprise a heat removal operation represented by block 227A and/or further comprise a heat redistribution operation represented by block 228A as described above with respect to block 221A.

The method then proceeds to block 222A', in which a parameter associated with the thermal condition of the gas turbine engine 101 is determined in the same way as the parameter is determined in block 222A described above. However, it should be appreciated that the parameters determined at blocks 222A and 222A', respectively, may be different. For instance, the parameter determined at block 222A may be a temperature or a pressure at an internal location in the gas turbine engine 101, whereas the parameter determined at block 222A' may be an alternative property at the internal location of the gas turbine engine 101 as described above. Other suitable combinations of the parameters determined at blocks 222A and 222A' will now be apparent to those skilled in the art. After the parameter has been determined at block 222A', the method 200A then proceeds to determining, at block 224A', whether the gas turbine engine 101 has met a further pre-determined criterion corresponding to a further thermally stabilised condition. The determination of whether the gas turbine engine 101 has met the further pre-determined criterion at block 224A' is based on the parameter determined at block 222A'. The method 200A includes continuing to perform the at least one further engine operation at block 221A' whilst the parameter is determined at block 222A' and also whilst the determination is made at block 224A'.

The at least one further engine operation is terminated in response to a determination being made (at block 224A') that the gas turbine engine 101 has met the further pre-determined criterion at block 229A'. Conversely, if a determination is made (at block 224A') that the gas turbine engine 101 has not met the further pre-determined criterion at block 229A', the method 200A returns to block 222A' such that the parameter is determined again. The method then continues to block 224A' as described above such that the determination of whether the gas turbine engine 101 has met the further pre-determined criterion is also made again. The at least one further engine operation is continued to be performed as the determination of the parameter and the determination of whether the gas turbine engine 101 has met the further pre-determined criterion, respectively, are made again.

Accordingly, until a determination is made (in block 224A') that the gas turbine engine 101 has met the further pre-determined criterion, the parameter is repeatedly determined over time as the method 200A repeatedly proceeds through a loop formed between blocks 222A' and 224A'. It follows that the parameter is repeatedly determined at discrete intervals in time. The method 200A may also include a loop counter and/or a loop interrupter (not shown) to prevent the loop from becoming an infinite loop if no determination is made that the further pre-determined criterion has been met after, for instance, a pre-selected time duration has elapsed since execution of the shutdown procedure was initiated and/or the parameter has been determined a pre-selected number of times.

It is generally determined that the gas turbine engine 101 has met the further pre-determined criterion (in block 224A') when the parameter associated with the thermal condition of the gas turbine engine 101 falls below a further thermal stabilisation threshold. The further thermal stabilisation threshold is related to the thermal stabilisation threshold (described above with respect to block 224). For example, if the parameter is the temperature at the internal location in the gas turbine engine 101, thermal stabilisation threshold may be chosen as a temperature value threshold corresponding to a temperature at the internal location of the gas turbine engine 101 which is indictive of the internal components of the gas turbine engine 101 having been sufficiently cooled during performance 225A of the idle rotation process that the idle rotation process should be terminated 229A to allow the method to perform 226A the cranked rotation process for additional cooling of the internal components of the gas turbine engine 101. The cranked rotation process generally facilitates such additional cooling by virtue of the lower heat generation rate within the gas turbine engine 101 during the cranked rotation process compared to the heat generation rate within the gas turbine engine 101 during the idle rotation process. Further, the cranked rotation process does not consume fuel, and it may be that cranked operation is associated with fewer logistical restrictions at an operating location (e.g., relating to safety, such as providing clearance around the engine during operation).

The further thermal stabilisation threshold may then be chosen as a further temperature value threshold corresponding to a temperature at the internal location of the gas turbine engine 101 which is indictive of the internal components of the gas turbine engine 101 having been sufficiently cooled during performance 226A of the cranked rotation process to allow the cranked rotation process to be terminated without a risk of detrimental thermal soak-back following termination of the cranked rotation process being unacceptably high.

In general, a determination (at block 224A') that the further pre-determined criterion has been met is indicative of the thermal condition of the gas turbine engine 101 having been stabilised to a greater degree than a determination that the pre-determined criterion has been met (at block 224). For example, if the further stabilisation threshold is a further temperature value threshold corresponding to a temperature at the internal location of the gas turbine engine 101 and the stabilisation threshold is a temperature value threshold corresponding to a temperature at the internal location of the gas turbine engine 101, the further temperature value threshold is lower than the temperature value threshold.

The further thermal stabilisation threshold may be chosen as being indicative of the thermal condition of the gas turbine engine 101 being such that a risk of detrimental effects associated with thermal soak-back in the gas turbine engine 101 has been sufficiently reduced to allow the cranked rotation operation to be terminated. As an example, if the parameter is the temperature at the internal location in the gas turbine engine 101, the further thermal stabilisation threshold may be chosen as a further temperature value threshold corresponding to a temperature at the internal location of the gas turbine engine 101 which is indictive of the internal components of the gas turbine engine 101 having been sufficiently cooled during performance 226A of the cranked rotation process to allow the cranked rotation process to be terminated without a risk of detrimental thermal soak-back following termination of the cranked rotation process being unacceptably high.

Additionally, or alternatively, the further thermal stabilisation threshold may be chosen as being indicative of the thermal condition being sufficiently stable (with respect to time) that continued performance 226A of the cranked rotation process is unlikely to result in significant additional cooling of the internal components of the gas turbine engine. As an example, if the parameter is the temperature at the internal location in the gas turbine engine 101, the further thermal stabilisation threshold may be chosen as a further temperature rate-of-change threshold corresponding to a temperature rate-of-change at the internal location of the gas turbine engine 101 which is indicative of the internal components of the gas turbine engine 101 not being subject to significant additional cooling by performance 226A of the cranked rotation process (e.g. as compared with a prior rate of cooling).

The first example method 200A allows a time spent performing an idle rotation process, and optionally a cranked rotation process, during a shutdown procedure to be minimised by continuously and/or repeatedly determining the thermal parameter during performance of the shutdown procedure while ensuring that the gas turbine engine is not at an unacceptably high risk of suffering from thermal soak-back on termination of the shutdown procedure. This enables effective mitigation of thermal soak-back in a gas turbine engines, while accurately monitoring achievement of a condition for termination to reduce a time spent performing the idle rotation process, and optionally the cranked rotation process, in a shutdown procedure. It may also enable reducing consuming an excessive amount of energy (e.g., fuel and/or stored electrical energy) during the shutdown procedure and/or a reduction in noise emissions during the shutdown procedure (which may typically be executed when the gas turbine engine 101 is on the ground). Reduced time spent performing the idle rotation process, and optionally the cranked rotation process, advantageously reduces fuel consumption, enables faster crew and passenger egress from an aircraft to which the gas turbine engine 101 is provided, reduces a risk of foreign object debris ingestion to the engine 101, and/or reduces a risk to the safety of ground crew working in proximity to the engine 101.

Figure 6:
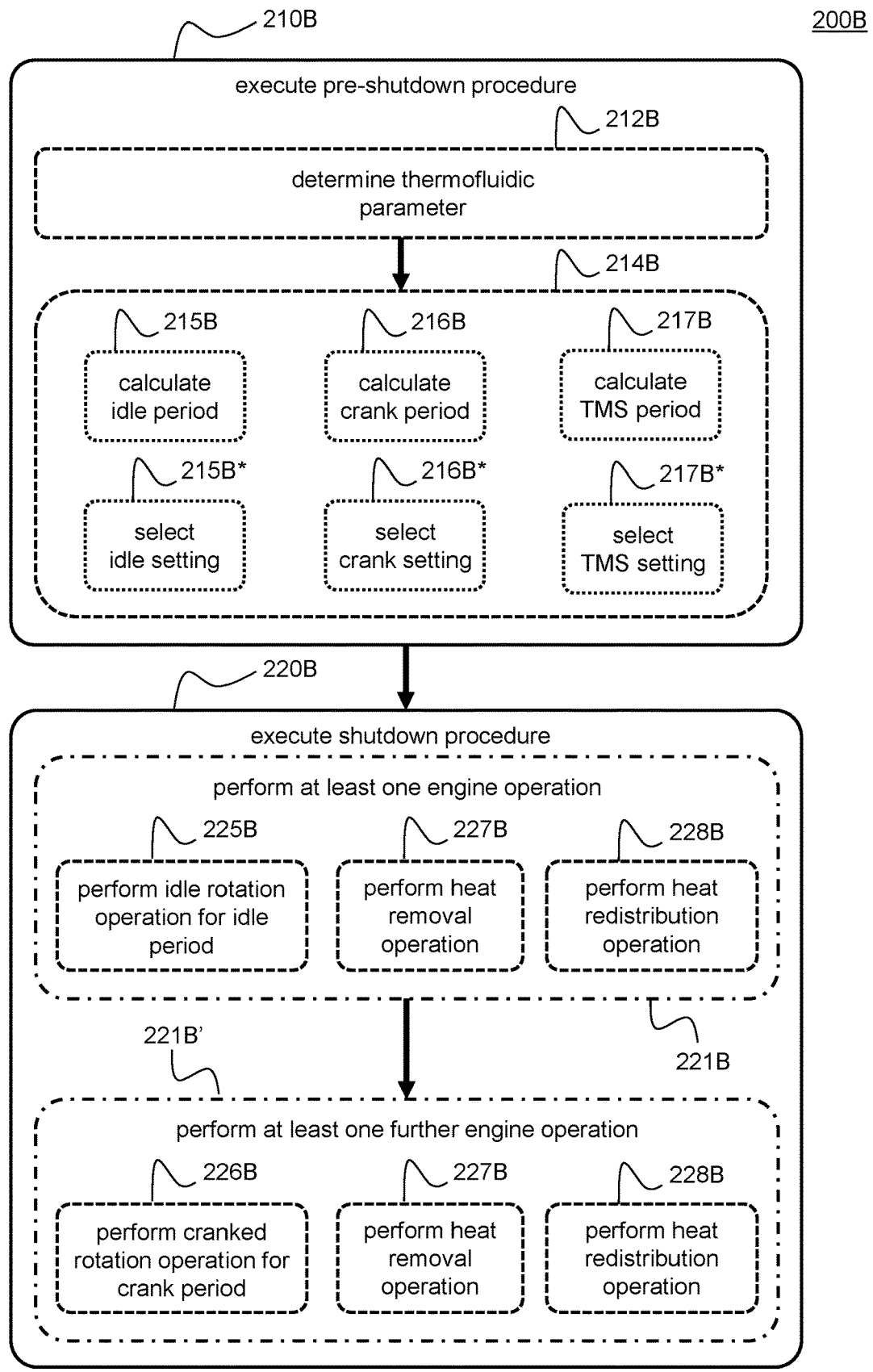
FIG. 6 is a flowchart which shows a second example method of operating a gas turbine engine of FIG. 1.

FIG. 6 is a flowchart which shows a second example method 200B of operating the gas turbine engine 101 described above with respect to FIG. 1. The second example method 200B includes, at block 210B, executing a pre-shutdown procedure of the gas turbine engine 101. The pre-shutdown procedure is executed 210B by a data processing apparatus such as the controller 190. However, the pre-shutdown procedure may be executed 210B by a data processing apparatus other than the controller 190, such as an external data processing apparatus or a remote controller 190'. Like initiation of execution 220A of the shutdown procedure of the gas turbine engine 101 described above with reference to FIG. 5, execution 210B of the pre-shutdown procedure may be initiated in response to receipt of a shutdown demand signal from an external data processing apparatus or in response a determination that a shutdown condition has been met.

In executing 210B the pre-shutdown procedure, the method 200B proceeds to determining, at block 212B, the parameter associated with the thermal condition of the gas turbine engine 101. The controller 190 determines the parameter in accordance with the techniques described above. After the parameter has been determined, the method 200B then proceeds to calculating, at block 215B, an idle period for which the idle rotation operation is to be performed in a subsequent shutdown procedure (see the description of block 220B below). Calculation 215B of the idle period is based on the parameter determined in block 212B.

Because block 212B is performed as part of execution of the pre-shutdown procedure 210B, the value of the parameter determined in block 212B is the value of the parameter of the gas turbine engine 101 before the idle rotation operation is performed in the subsequent shutdown procedure. However, as a result of cooling of the gas turbine engine during performance of the idle rotation operation, the thermal condition of the gas turbine engine 101 will vary with time as the idle rotation operation is performed.

In particular, the duration of the idle period corresponding to the gas turbine engine meeting the pre-determined criterion may be predictively calculated 215B by reference to a physics-based or statistically-based model which relates the parameter determined in block 212B to a variation in the thermal condition of the gas turbine engine 101 with time during performance of the idle rotation operation in block 225B. In other words, the model predicts an evolution (e.g., time-based change) of the parameter of the gas turbine engine 101 over time as the idle rotation operation is performed. The model may be, for example, an analytical mathematical model such as a lumped-element model of the thermal properties of the gas turbine engine 101. The analytical mathematical model of the thermal properties of the gas turbine engine 101 may comprise a 2-dimensional parameterised curve or a 3-dimensional parameterised curve, as will be understood by those skilled in the art. The analytical model may require only a single computational pass to be completely executed (e.g., is non-iterative). Alternatively, the model may be, for instance, a numeral mathematical model such as a finite-element model of the thermal properties of the gas turbine engine 101. Otherwise, the model may be a data-driven "black box" model of the thermal properties of the gas turbine engine 101, such as a neural network model. Further, the model may comprise a look-up table relating the parameter of the gas turbine engine 101 with discrete points in time. In addition, or instead, the model may be a type of response surface model derived from response surface methodology techniques.

The model may include information relating to predicted rates of cooling of the gas turbine engine 101 as a consequence of the idle rotation operation being performed. The predicted rates of cooling of the gas turbine engine as a consequence of the idle rotation operation being performed may vary according to a predicted rotational speed of the spool 121, 122 of the gas turbine engine 101 during the idle rotational operation and ambient environment conditions. The model may also include information relating to predicted rates of cooling of the gas turbine engine 101 as a consequence of the heat removal operation being performed and/or the heat redistribution operation being performed. The predicted rates of cooling as a consequence of the heat removal and/or redistribution operations may vary based on a heat removal capacity and/or a heat redistribution capacity of the TMS 118, which may in turn be based on a status information for the TMS 118. The status information for the TMS 118 may relate to a temperature of the thermal sink and/or thermal source as discussed above, as well as a configuration of the TMS 118 and/or an availability of the TMS 118 for cooling.

The idle period may be calculated 215B based on the determined parameter as a duration of the idle period after which the gas turbine engine is predicted to be meet the pre-determined criterion and therefore be in the thermally stabilised condition. The model described above may be used to predictively calculate the duration of the idle period necessary for the gas turbine engine to be in the thermally stabilised condition after performance of the idle rotation operation. It may be predicted that the gas turbine engine 101 will have met the pre-determined criterion when the parameter associated with the thermal condition of the gas turbine engine 101 is predicted to fall below a thermal stabilisation threshold such as a temperature value threshold, or correspondingly a rate of change of the parameter falls below a temperature rate-of-change threshold, or similarly with respect to a temperature-difference value threshold, a temperature-difference rate-of-change threshold, or a pressure value threshold in a similar way to that described above with reference to block 224A.

The method 200B may also include calculating, at block 216B, a crank period for which the cranked rotation operation is to be performed in the subsequent shutdown procedure. Calculation 216B of the crank period is based on the parameter determined in block 212B, and may performed concurrently, sequentially, or at least partially concurrently and at least partially sequentially to calculation 215B of the idle period. In the example of FIG. 6, blocks 215B and 216B are performed at least partially concurrently as part of block 214B.

The crank period may be calculated 216B based on the determined parameter as a duration of the crank period after which the gas turbine engine is predicted to be meet a further pre-determined criterion and therefore be in a further thermally stabilised condition. The model described above with reference to calculation 215B of the idle period may also be used to predictively calculate the duration of the cranked rotational period necessary for the gas turbine engine to be in the thermally stabilised condition after performance of the idle rotation operation and the cranked rotation operation in sequence.

For this purpose, the model may include information relating to predicted rates of cooling of the gas turbine engine 101 as a consequence of the cranked rotation operation being performed. The predicted rates of cooling of the gas turbine engine as a consequence of the cranked rotation operation being performed may vary according to a predicted rotational speed of the spool 121, 122 of the gas turbine engine 101 during the cranked rotational operation and ambient environment conditions. The model may also include information relating to predicted rates of cooling of the gas turbine engine 101 as a consequence of the heat removal operation being performed and/or the heat redistribution operation being performed. The predicted rates of cooling as a consequence of the heat removal and/or redistribution operations may vary, for example based on a heat removal capacity, a heat redistribution capacity of the TMS 118, and/or status information for the TMS. A heat removal/distribution capacity may in turn be based on status information for the TMS 118. The status information for the TMS 118 may relate to a temperature of the thermal sink and/or thermal source as discussed above, as well as a configuration of the TMS 118 and/or an availability of the TMS 118 for cooling.

It may be predicted that the gas turbine engine 101 will have met the further pre-determined criterion when the parameter associated with the thermal condition of the gas turbine engine 101 is predicted to fall below a further thermal stabilisation threshold such as a further temperature value threshold, a further temperature rate-of-change threshold, a further temperature-difference value threshold, a further temperature-difference rate-of-change threshold, or a further pressure value threshold in a similar way to that described above with reference to block 224A. Otherwise, the relationship between the further stabilisation threshold and the stabilisation threshold is generally as described above with respect to the first example method 200A.

Block 214B may include concurrently calculating the idle period and the crank period so that an objective function is minimised. The objective function may be an energy consumption associated with execution 220B of the shutdown procedure or a total period of the idle period and the crank period, as explained in further detail below.

In some examples, block 214B includes concurrently calculating the idle period and the crank period so that the energy consumption associated with execution 220B of the shutdown procedure is minimised. For instance, it may be that a total predicted energy consumption, $E_t$, associated with execution 220B of the shutdown procedure is to be minimised. The total predicted energy consumption, $E_t$, is the arithmetic sum of the predicted energy consumption associated with performing the idle rotation operation, $E_i$, and the predicted energy consumption associated with performing the cranked rotation operation, $E_c$. Each of the predicted energy consumptions, $E_i$ and $E_c$, may be predicted using, for example, stored power consumption data relating to performance of the idle rotation operation and the cranked rotation operation, respectively. Block 214B may include iteratively comparing the predicted total energy consumption, $E_t$, associated with performing the idle rotation for differing idle periods and crank periods until a minimum possible predicted total energy consumption, $E_t$, associated with executing the shutdown procedure is converged on while ensuring that the gas turbine engine 101 is in the further thermally stabilised condition after execution 220B of the shutdown procedure. This may be referred to as an optimisation convergence technique (e.g., an optimiser algorithm). Other optimisation techniques which may be used for this purpose will now be apparent to those skilled in the art. The idle period and the crank period which correspond to the minimum possible total energy consumption, $E_t$, associated with executing the shutdown procedure are then used as the idle period and crank period for which the respective rotation processes are to be performed 225B, 226B in the shutdown procedure.

Otherwise, it may be that the energy consumption associated with performing the cranked rotation operation, $E_c$, is to be minimised. As discussed above, spool may be driven to rotate by the electric machine 111, 113 during performance 226B of the cranked rotation operation. In turn, the electric machine 111, 113 may receive electrical power from an electrical energy supply (such as a battery provided to the apparatus 100 or the gas turbine engine 101 or a shore power connection). If so, depending on an availability of the electrical energy supply (e.g., a state of charge of the battery or a presence of the shore power connection), the energy consumption associated with performing the cranked rotation operation, $E_c$, may be selected to be minimised as an objective for calculation 214B of the idle period and the crank period. A similar optimisation technique to that described above may be employed for determining the idle period and the crank period which are predicted to result in the energy consumption associated with performing the cranked rotation operation, $E_c$, being minimised while ensuring that the gas turbine engine 101 is in the further thermally stabilised condition after execution 220B of the shutdown procedure.

Similar methods may be used in block 214B to minimise the energy consumption associated with performing the idle rotation operation, $E_i$. For instance, if it is desirable to minimise emissions from the gas turbine engine 101 during execution of the shutdown procedure, the energy consumption associated with performing the idle rotation operation, $E_i$, may be selected to be minimised as an objective for calculation 214B of the idle period and the crank period.

In other examples, block 214B includes calculating the idle period and the crank period so that a total period of the idle period and the crank period is minimised or is no greater than a predetermined total period target. The total period, $T_t$, is the arithmetic sum of the idle period, $T_i$, and the crank period, $T_c$. For example, if it is anticipated that the gas turbine engine 101 will restart shortly after execution 220B of the shutdown procedure (such as during a quick-turn-around operation), the total period may be selected to be minimised for calculation 214B of the idle period and crank period while ensuring that the gas turbine engine 101 is in the thermally stabilised condition after execution 220B of the shutdown procedure. Otherwise, the predetermined total period target may be determined based on received information relating to upcoming aircraft usage (e.g., information relating to a remaining time until the gas turbine engine is expected to be restarted). Suitable optimisation techniques, similar to those described above for the purpose of minimising energy consumption, may be employed in the method 200B for this purpose.

In further examples, block 214B includes calculating the idle period and the crank period so that a predicted wear on or a predicted degradation of an internal component of the gas turbine engine 101 associated with execution 220B of the shutdown procedure is minimised. In broad terms, the residual heat transferred through a gas turbine engine due to thermal soak-back is associated with detrimental effects on an internal component of the gas turbine engine. For example, the residual heat may cause coking in fuel-carrying components, deterioration of seals, thermal stresses in component casings, thermal damage to sensitive electronic/electrical components, as well as compressor tip rubbing (e.g., wear) during a subsequent engine startup operation due to thermal expansion. A component model may be used to relate the parameter determined at block 212B with predicted detrimental effects on an internal component of the gas turbine engine 101. The internal component may be, for example, a fuel-carrying component, a seal, a component casing, a sensitive electronic/electrical component, a fan, a compressor or a turbine of the gas turbine engine. The detrimental effects generally relate to degradation of or wear on the internal component, and may more specifically be associated with fuel coking, seal deterioration, thermal stresses, thermal damage or subsequent mechanical wear.

In general, the objective function to be minimised may be selected based on any of the example factors described above, and any suitable combination thereof. Further, the objective function to minimised may be selected based on an objective signal from an external data processing apparatus such as, for example, an avionics system of an aircraft to which the gas turbine engine 101 is provided.

The second example method 200B also includes, at block 220B, executing a shutdown procedure of the gas turbine engine 101 by the controller 190 (which may be the same as the controller 190 which executed 210B the pre-shutdown procedure or different to the controller 190' which executed 210B the pre-shutdown procedure). Executing 220B the shutdown procedure in the second example method 200B may be in accordance with executing 220A the shutdown procedure in the first example method 200A described above with reference to FIG. 5.

Executing 220B the shutdown procedure includes, in block 221B, performing at least one engine operation. The at least one engine operation includes at least block 225B, which comprises performing the idle rotation operation of the gas turbine engine 101 for the idle period (e.g., continuously throughout the idle period) as calculated in block 215B during execution 210B of the pre-shutdown procedure. In addition to the idle rotation operation represented by block 225B, the at least one engine operation may further comprise a heat removal operation represented by block 227B and/or further comprise a heat redistribution operation represented by block 228B. The heat removal operation 227B and/or the heat redistribution operation 228B may be performed for the idle period (e.g., continuously throughout the idle period) or for only part of the idle period. If the at least one engine operation comprises both the heat removal operation and the heat redistribution operation, these operations may be performed concurrently, sequentially, or at least partially concurrently and at least partially sequentially. The heat removal operation includes controlling the TMS 118 to cause heat to be removed from the gas turbine engine 101 as described above with reference to FIGS. 1-5. Similarly, the heat redistribution operation includes controlling the TMS to cause heat to be redistributed within the gas turbine engine 101 as also described above with reference to FIGS. 1-5.

In examples of the method 200B in which executing 210B the pre-shutdown procedure includes calculating 216B the crank period, executing 220B the shutdown procedure includes, in block 221B', performing at least one further engine operation. The at least one further engine operation includes at least block 226B, which comprises performing the cranked rotation operation of the gas turbine engine 101 for the crank period (e.g., continuously throughout the crank period) as calculated in block 216B during execution 210B of the pre-shutdown procedure. In addition to the cranked rotation operation represented by block 226B, the at least one engine operation may further comprise a heat removal operation represented by block 227B and/or further comprise a heat redistribution operation represented by block 228B as described above with respect to block 221B. The heat removal operation 227B and/or the heat redistribution operation 228B may be performed for the crank period (e.g., continuously throughout the crank period) or for only part of the crank period.

The method 200B (e.g., the pre-shutdown procedure 210B) may also include calculating, at block 217B, a TMS period for which the heat redistribution operation and/or the heat removal operation is to be performed 227B, 228B while executing 220B the subsequent shutdown procedure. Calculation 217B of the TMS period may be based on the parameter determined in block 212B, and may performed concurrently, sequentially, or at least partially concurrently and at least partially sequentially to calculation 215B of the idle period and optionally to calculation 216B of the crank period. In the example of FIG. 6, blocks 215B, 216B and 217B are performed at least partially concurrently as part of block 214B.

The TMS period may be calculated 217B based on the determined parameter as a minimum duration of the TMS period which is required to prevent significant thermal damage to the thermal source of the gas turbine engine 101 as a result of thermal soak-back and/or significant thermal damage to another internal component of the gas turbine engine 101 which is at risk of being affected by heat transfer from the thermal source as a result of thermal soak-back (e.g. a internal component which may be subject to heating by conduction, convection and/or radiation from the thermal source). As discussed above, the thermal source may be an engine-mounted or engine proximal accessories such as control units and/or electrical/electronic components. As will be apparent to those skilled in the art, the parameter determined at block 212B may be indicative of a risk of thermal damage to the thermal source or another component of the gas turbine engine 101 as discussed above.

Depending on the duration of the TMS period calculated at block 217B, the method 200B may further include determining whether to perform the heat removal operation as represented by block 227B and/or the heat redistribution operation as represented by block 228B concurrently with performing the idle rotation operation as represented by block 225B and/or concurrently with performing the cranked rotation operation as represented by block 226B during execution 220B of the shutdown procedure. In some examples, the TMS period may be greater than the idle period and/or greater than the crank period, such that the heat removal operation as represented by block 227B and/or the heat redistribution operation is performed at least partially concurrently with performing the idle rotation operation as represented by block 225B and at least partially concurrently with performing the cranked rotation operation as represented by block 226B. In other words, the heat removal operation and/or the heat redistribution operation may continue to be performed 227B, 228B as the method 200B moves from performing 225B the idle rotation operation to performing 226B the cranked rotation operation while executing 220B the shutdown procedure.

The method 200B (e.g., the pre-shutdown procedure 210B) may also include selecting, at block 217B\*, an operating setting (e.g., a TMS operating setting) in which the TMS 118 is to be operated to perform 227B the heat removal operation and/or perform 228B the heat redistribution operation during execution 220B of the subsequent shutdown procedure. The operating setting of the TMS 118 may be a selected control setting for a flow control device of the TMS 118, at least one selected thermal sink to which the TMS 118 transfers heat and/or at least one selected thermal source from which the TMS 118 transfers heat.

Selection of the operating setting at block 217B\* may be based on the parameter determined at block 212B and/or an availability of the TMS 118 for cooling. The TMS 118 may receive electrical power from an electrical energy supply (such as a battery provided to the apparatus 100 or the gas turbine engine 101 or a shore power connection). The availability of the TMS 118 for cooling may in turn depending on an availability of the electrical energy supply (e.g., a state of charge of the battery or a presence of the shore power connection) for powering components of the TMS 118, such as flow control device(s).

A rate of cooling provided by the TMS 118 to the thermal source(s) may be defined by the selected control setting for a flow control device of the TMS 118. As will be appreciated in view of the above description of the TMS 118 and the example thermal management systems described with respect to FIGS. 2 and 3, the flow control device of the TMS 118 may be a compressor 402 (if the TMS 118 comprises a vapour-compression refrigeration circuit 400), a pump 460 (if the TMS 118 comprises a thermal bus 401), or a valve of the TMS 118 (as will be understood by those skilled in the art).

As an example, the parameter determined at block 212B may be such that it is determined that a relatively high rate of cooling should be provided to the thermal source(s) of the gas turbine engine 101. Accordingly, if the electrical energy supply for the TMS 118 is available and sufficient, the control setting for the flow control device may be selected to provide the relatively high rate of cooling to the thermal source(s) of the gas turbine engine 101. However, if the electrical energy supply for the TMS 118 is not available or is insufficient, the control setting for the flow control device may not be selected to provide the relatively high rate of cooling to the thermal source(s) of the gas turbine engine 101.

As an additional example, the parameter determined at block 212B may be such that the operating setting of the TMS 118 is selected 217B\* so that, during performance 227B of the heat removal operation or performance 228B of the heat redistribution operation, the TMS 118 will transfer heat to fuel such that fuel is utilised as a thermal sink in addition to and/or instead of transferring heat to ambient air as a thermal sink. This may be to provide an increased rate of cooling to the thermal source(s) of the gas turbine engine 101 during execution 220B of the shutdown procedure.

As a further example, the parameter determined at block 212B may be such that the operating setting of the TMS 118 is selected 217B* so that, during performance 227B of the heat removal operation or performance 228B of the heat redistribution operation, the TMS 118 will transfer heat from engine-mounted or engine proximal accessories as heat sources to avoid thermal damage to these components as a result of thermal soak-back. Conversely, the parameter determined at block 212B may be such that it is determined (at block 217B*) that, during performance 227B of the heat removal operation or performance 228B of the heat redistribution operation, the TMS 118 will not transfer heat from engine-mounted or engine proximal accessories as heat sources.

In a similar way, the method 200B (e.g., the pre-shutdown procedure 210B) may additionally or alternatively include selecting, at block 215B*, an idle operating setting in which the gas turbine engine 101 is to be operated to perform 225B* the idle rotation operation during execution 220B of the subsequent shutdown procedure. In addition, or instead, the method 200B (e.g., the pre-shutdown procedure 210B) may also include selecting, at block 216B*, a crank operating setting in which the gas turbine engine 101 is to be operated to perform 226B* the cranked rotation operation during execution 220B of the subsequent shutdown procedure. The idle operating setting or the cranked operating setting of the gas turbine engine 101 may be a selected rotational speed setting target for a spool 121, 122 of the gas turbine engine 101 or a selected setting of a variable-geometry internal component of the gas turbine engine 101 during performance 225*, 226* of the idle rotation operation or the cranked rotation operation as applicable. The variable geometry internal component of the gas turbine engine 101 may be, for instance, a variable angle stator vane or a variable geometry nozzle.

Selection of the operating setting at block 215B* or block 216B* may generally be based on the parameter determined at block 212B. As an example, the parameter determined at block 212B may be such that it is determined that a relatively high rate of cooling should be provided to the thermal source(s) of the gas turbine engine 101. Accordingly, the rotational speed setting for the spool 121, 122 of the gas turbine engine 101 and/or the setting of the variable-geometry internal component of the gas turbine engine 101 may be selected to provide the relatively high rate of cooling to the thermal source(s) of the gas turbine engine 101.

The second example method 200B enables accurate and effective mitigation of thermal soak-back in a gas turbine engines by reducing time spent performing the idle rotation process, and optionally the cranked rotation process, in the shutdown procedure 220B and/or reducing consumption of energy (e.g., fuel and/or stored electrical energy) during the shutdown procedure 220B. Reduced time spent performing the idle rotation process, and optionally the cranked rotation process, advantageously reduces fuel consumption, enables faster crew and passenger egress from an aircraft to which the gas turbine engine 101 is provided, reduces a risk of foreign object debris ingestion to the engine 101, and/or reduces a risk to the safety of ground crew working in proximity to the engine 101. In addition, the second example method 200B enables an indication of the total period of the idle period and the crank period to be provided to an operator of the gas turbine engine 101 or an operator of an aircraft to which the gas turbine engine 101 is incorporated in advance. This may enable better planned management of the gas turbine engine 101 or the aircraft during execution of the method 200B.

These benefits are achieved while only determining the parameter associated with the thermal condition of the gas turbine engine during execution of the pre-shutdown procedure at block 210B rather than while the shutdown procedure is executed at block 220B. Accordingly, the second example method 200B does not rely on redetermination and/or active monitoring of the parameter associated with the thermal condition of the gas turbine engine during execution of the shutdown procedure at block 220B. Therefore, a sensor arrangement 180 provided to the gas turbine engine 101 may be switched off during execution 220B of the shutdown procedure. This reduces a computational burden associated with performance of the second example method 200B.

The second example method 200B may also facilitate the use of a less complex sensor arrangement 180 for determining the parameter associated with the thermal condition of the gas turbine engine 101, and, in some examples, eliminate the need for a dedicated sensor arrangement for determining the parameter (e.g., if the parameter is determined based on operating information).

Further, in the second example method 200B, the parameter associated with the thermal condition of the gas turbine engine 101 may be predictively determined (at block 212B) based on operating information received by, or stored in, the controller 190 rather than, for example, a signal received from a dedicated sensing arrangement 180 as described herein. The operation information may relate to historical usage data of the gas turbine engine 101, internal sensor data of the gas turbine engine 101 and/or ambient environment data. The historical usage data may include, for instance, historical journey data (such as recent flight data if the gas turbine engine 101 is incorporated within an aircraft), historical power demand data (such as recent thrust demands and/or electrical power demands from the gas turbine engine 101) and the like. The internal sensor data may include data received from conventional sensors of the gas turbine engine 101, such as rotational speed sensors, fuel flow sensors, pressure ratio sensors (to monitor pressure ratios across the compressors 104, 105 or the turbines 107, 108 of the gas turbine engine 101). The ambient environment data generally relates to the ambient environment conditions and may include weather data (received from, for example, an external system and/or an internal weather monitoring system). As a result, the gas turbine engine 101 need not necessarily comprise a dedicated sensing arrangement 180. This enables a complexity and/or an installation weight of the gas turbine engine 101 to be reduced.

Controlling the TMS 118 to cause heat to be removed from the gas turbine engine 101 during the heat removal operation at block(s) 227A, 228B and/or controlling the TMS 118 to cause heat to be redistributed within the gas turbine engine 101 during the heat redistribution operation at block(s) 228A, 228B may result in the pre-determined criterion being met more quickly. Accordingly, a duration of the shutdown procedure represented by block(s) 220A, 220B may be reduced. As discussed above, the TMS 118 is a general-purpose system suitable for managing thermal loads in a variety of operating states of the gas turbine engine 101. Accordingly, the TMS 118 may be an existing system provided for the purpose of thermal management of the gas turbine engine 101 during operation in a power generating state. Therefore, utilisation of the TMS 118 for redistribution of heat and/or removal of heat from the gas turbine engine 101 during the example methods 200A, 200B may not further increase a part count (e.g., a complexity) of and/or a installation mass of the gas turbine engine 101. The TMS 118 comprising a vapour-compression refrigeration circuit and/or a thermal bus as described herein may enable more effective redistribution of heat within the gas turbine engine 101 and/or more effective removal of heat from the gas turbine engine 101.

Although it has been described that the process medium conveyed by the thermal bus 401 may a fuel suitable for combustion in the combustor 106 of the gas turbine engine 101, this need not necessarily be the case. Otherwise, the process medium conveyed by the thermal bus may be any suitable kind of coolant, and may comprise water, glycol, mineral oil, synthetic oil, refrigerant or the like. Accordingly, the thermal bus 401 need not necessarily be adapted to receive fuel (as the process medium) from the fuel tank 41 and/or return fuel to the fuel tank 41. Further, in examples in which the process medium is fuel, the thermal bus 401 may not be in fluid communication with a combustor line 412.

Further, although it has been described that the gas turbine engine 101 is provided with a TMS 118, this disclosure envisages that the gas turbine engine 101 may not comprise a TMS 118 and that the methods 200A, 200B described herein do not comprise performing a heat removal operation or a heat distribution operation using the TMS 118.

In both the first example method 200A and the second example method 200B, reference is made to determination of a parameter associated with a thermal condition of the gas turbine engine 101 at blocks 222A and 212B, respectively. This disclosure envisages that both the first example method 200A and the second example method 200B may include determining a plurality of parameters (e.g., a set of parameters) associated with the thermal condition of the gas turbine engine 101, each of the plurality of parameters being in accordance the parameters described herein. The first example method 200A may then include determining whether the gas turbine engine 101 has been the pre-determined criterion discussed above with reference to block 224A based on each of the determined plurality of parameters. The second example method may then include calculating the idle period (at block 215B) based on each of the plurality of determined parameters, and optionally calculating the crank period based on each of the plurality of predetermined parameters.

Various examples have been described, each of which feature various combinations of features. It will be appreciated by those skilled in the art that, except where clearly mutually exclusive, any of the features may be employed separately or in combination with any other features and the disclosure extends to and includes all combinations and sub-combinations of one or more features described herein.

It will also be appreciated that whilst the disclosure has been described with reference to aircraft and aircraft propulsion systems, the electric machine drive techniques described herein could be used for many other applications. These include, but are not limited to, automotive, marine and land-based applications.

What is claimed is:

1. A method of operating a gas turbine engine having a spool, the method comprising:
   executing, by a controller, a shutdown procedure which includes:
      performing an idle rotation operation;
      determining a parameter associated with a first thermal condition of the gas turbine engine while the idle rotation operation is performed, the parameter being a monitored or predicted pressure at a location in the gas turbine engine;
      determining, based on the determined parameter, whether the gas turbine engine has met a pre-determined criterion corresponding to a thermally stabilised condition, wherein the pre-determined criterion includes a thermal stabilization threshold that is a pre-determined value, and the pre-determined value corresponds to a pressure value threshold; and
      terminating the idle rotation operation in response to a determination that the gas turbine engine has met the pre-determined criterion.

2. The method of claim 1, wherein during performance of the idle rotation operation, a turbine of the gas turbine engine expands hot combustion products from a combustor to drive the spool to rotate.

3. The method of claim 1, wherein the shutdown procedure is executed in response to:
   receipt of a shutdown demand signal; or
   a determination that a shutdown condition has been met.

4. The method of claim 1, wherein executing the shutdown procedure further includes:
   following termination of the idle rotation operation, performing a cranked rotation operation;
   determining a parameter associated with a second thermal condition of the gas turbine engine while the cranked rotation operation is performed;
   determining, based on the determined parameter of the second thermal condition, whether the gas turbine engine has met a further pre-determined criterion corresponding to a further thermally stabilised condition; and
   terminating the cranked rotation operation in response to a determination that the gas turbine engine has met the further pre-determined criterion.

5. The method of claim 4, wherein during performance of the cranked rotation operation:
   an air turbine starter expands compressed air received from an external air source to drive the spool to rotate;
   a mechanical coupling with an external power source drives the spool to rotate; or
   an electric machine drives the spool to rotate.

6. The method of claim 1, wherein the parameter associated with the thermal condition of the gas turbine engine is determined based on a signal received from a sensing arrangement.

7. The method of claim 1, wherein the gas turbine engine is provided with a thermal management system, and wherein executing the shutdown procedure further includes:
   performing a heat removal operation comprising controlling the thermal management system to cause heat to be removed from the gas turbine engine; and/or
   performing a heat redistribution operation comprising controlling the thermal management system to cause heat to be redistributed within the gas turbine engine.

8. The method of claim 7, wherein the thermal management system includes a fluid pathway for circulating a coolant, wherein the fluid pathway is configured to prevent the coolant circulated therein from being discharged to ambient air.

9. The method of claim 7, wherein the thermal management system includes a vapour-compression refrigeration circuit.

10. The method of claim 7, wherein the thermal management system includes a thermal bus configured to transfer heat from a thermal source of the gas turbine engine to a process medium conveyed by the thermal bus.

11. The method of claim 10, wherein the thermal bus is configured to reject heat from the process medium to an external medium.

12. The method of claim 10, wherein the process medium is a fuel for combustion in a combustor of the gas turbine engine.

13. The method of claim 12, wherein the thermal bus is configured to circulate the fuel between a heat transfer location for heat transfer with the thermal source and a fuel tank, wherein the heat transfer location is upstream of the fuel tank.

14. An apparatus including:
a gas turbine engine having a spool; and
a controller configured to carry out the method of claim 1.

15. A non-transitory machine readable medium comprising instructions which, when executed by a controller of an apparatus comprising the controller and a gas turbine engine having a spool, cause the controller to carry out the method of claim 1.

* * * * *